Patented Apr. 10, 1951

2,548,594

UNITED STATES PATENT OFFICE 2,548,594

TREATMENT OF FERMENTATION PRODUCTS

Joseph Bernard Edmonds, Baltimore, Md.

No Drawing. Application April 2, 1948,
Serial No. 18,721

3 Claims. (Cl. 99—105)

This invention relates to an improved process for quantitative precipitation of excess tartrates from juices and wines, particularly grape juices and wines, at normal temperatures by means of a soluble compound of calcium.

Prior processes involving the removal of excess tartrates of argols from wines or the like generally necessitate long periods of storage at low temperatures, or shorter periods with refrigeration at freezing temperatures of 18–29 degrees F. and filtation of the bitartrates at 32–35 degrees F. to prevent the precipitate from redissolving, since the acid tartrate increases in solubility with a rise in temperature. Other methods employed in the removal of the excess tartrates involve the introduction of precipitating agents and particularly calcium salts, both inorganic and organic. However, these processes are undesirable since they affect the quality of the product, as well as change the basic composition so as to violate the Federal laws on the subject. Other methods of preparation involve the addition of acids which yield toxic products, or the zeolitic treatment of juices, or oxidation of the frozen grape juices to induce precipitation, but none of these have proved to be entirely satisfactory.

It has now been discovered that any calculated amount of potassium bitartrate can be quantitatively precipitated from grape juice or wine by the addition of a prepared compound of calcium without affecting the color, flavor, or basic composition of the product so treated. A stable product, free of excess tartrates is obtained thereby. In the present method, long periods of storage at low temperatures, or refrigeration of the treated juice or wine is avoided.

In order to insure complete precipitation of the tartrates, it is necessary to supply enough calcium ions to precipitate the desired quantity of potassium bitartrates as well as raise the pH of the solution approximately one unit to insure best results. While it is simple to determine the calcium ions needed to precipitate the tartrates plus an excess of the mixture to raise the pH, it has been discovered that an equivalent weight of the mixture will react with the same weight of the potassium bitartrate, disclosing a complete exchange of the calcium and potassium ions, and having at the same time sufficient excess of the mixture to raise the pH value of the treated product, thus obviating the necessity for tedious calculations. This definite reaction is apparently controlled by the pH of the compound and its limited solubility.

An object of the invention is to produce an excess tartrate free product without changing the color, flavor, or basic composition in any manner.

Another object of the invention is to obtain rapid results without the necessity for long periods of storage or refrigeration to the undesired tartrates contained in the grape juices or wines.

A futher object of the invention is to eliminate the necessity for carefully calculating the amounts of precipitating agent needed to efficiently carry out the process.

A still further object of the invention is to provide a compound that will not increase in solubility with rise in temperature and its solubility is not affected by the addition to wines or grape juices.

And yet a further object of the invention is to provide an inexpensive method of rapidly removing tartaric acid and tartrates from the materials to be treated.

The preparation of this compound requires that the calcium oxide or hydrate be neutralized with fruit acids such as citric or malic acid to result in a mixture having an alkalinity of 7.5–7.8.

The ingredients employed are:
(1) Malic acid or citric acid
(2) Calcium oxide (free from iron and heavy metals) or calcium hydroxide (as above) U. S. P.

Examples of the method of preparation:

EXAMPLE I

| | Parts |
|---|---|
| Malic acid | 3.00 |
| Calcium oxide | 1.29–1.31 |
| or | |
| Calcium hydroxide | 1.66–1.68 |

Sufficient water to wet the above mixture was added, after which it was mixed and agitated until all lumps were removed and the resulting slurry showed a pH of 7.8–8.2. The heat of reaction produced a fine white powder having a solubility of 0.4 gm. in 100 c. c. of cold water and a solubility of 0.5 gm. in 100 c. c. of hot water, which solubility is not increased by the addition of grape juice or wine.

EXAMPLE II

| | Parts |
|---|---|
| Citric acid | 3.00 |
| Calcium oxide | 1.230–1.235 |
| or | |
| Calcium hydroxide | 1.66–1.68 |

The above substances were wetted and mixed in the manner of Example I to produce a fine white powder similar to that obtained in the preceding illustration.

The proportions of materials used are very definite and are of a limited range in order to insure the proper pH and solubility of the resulting compound.

In order to treat grape juice or fermented grape wine with the mixture prepared in Examples I and II, it is necessary to determine the amount of potassium bitartrate and the pH value of the product to be treated. It has been found that in normal practice grape juice requires the removal of approximately 0.20–0.30 percent of potassium bitartrate, and fermented wine requires the removal of 0.10–0.20 percent in order to produce a stable product.

The following examples illustrate the practical use of the invention, although it is to be understood that they can be varied to meet other conditions and are for the purposes of illustration only and are not limited to the specific details disclosed therein.

EXAMPLE III 100 gallons of freshly pressed grape juice containing potassium bitartrate calculated as 1.00 percent total tartaric acid, with a pH value of 2.5 requires the removal of 0.3 percent, or 2.5 pounds of potassium bitartrate to produce a juice free from excess tartrates. To precipitate this amount of potassium bitartrate, and to raise the pH value to 3.5, it requires the same amount of the mixture as prepared in the above examples, or 2.5 pounds per 100 gallons of the juice. After adding the mixture, the juice is heated to 120–130 degrees F., mixed thoroughly, and then allowed to stand at normal room temperatures for approximately 15 days to allow precipitation of the desired amount of potassium bitartrate as insoluble calcium tartrate.

Prolonged agitation without heating immediately after addition of the mixture will speed up the reaction, and insure complete mixing. The crystallization will occur immediately, and the crystals will settle in the bottom of the vessel. After the reaction is completed, the juice is then drawn or racked off, free from the insoluble calcium tartrate crystals. The storage of the grape juice during the period of treatment can either be pasteurized and sealed in closed containers, or refrigerated to prevent fermentation, without interference with the efficiency of the above process in removing the desired amount of potassium bitartrate.

The resultant juice will show a reduction of cream of tartar, total tartaric acid, and ash.

EXAMPLE IV 100 gallons of fermented grape wine containing potassium bitartrate calculated as 0.55 percent total tartaric acid, and with a pH of 3.5, was used. It is necessary to remove 0.1 percent or 0.84 pound of potassium bitartrate in this sample in order to produce a stable product and this requires 0.84 pound of the alkaline mixture to precipitate the equivalent amount of potassium bitartrate. After addition of the calcium, the wine is then heated to 120–130 degrees F., or with a portion of the wine, and then the entire quantity is mixed thoroughly. Prolonged agitation or pumping over without heat also speeds up the reaction and insures complete mixing. The wine is then permitted to remain at normal temperatures, that is, 65–75 degrees F. for approximately 15 days in order to precipitate the desired quantity of potassium bitartrate as insoluble calcium tartrate. This is then filtered out by ordinary filtration methods at normal temperatures.

Any wine can be treated immediately with the above mentioned salts and the precipitates formed will be allowed to settle throughout the usual period of cellar treatment, or a finished wine can be treated and allowed to remain in storage until the precipitation is complete. This treatment will not interfere with the normal operations carried out in the manufacture of wines. The resultant wine after treatment will show a reduction in the amount of cream of tartar, total acids as tartaric, and ash, and is exactly as is usually found in the normal practice of long periods of storage at low temperatures, or refrigeration at sub-freezing temperatures for shorter periods.

A number of fine wines and grape juices were treated by the method of this invention and the results obtained compared favorably with similar wines that were untreated or treated by the conventional refrigeration method. Below are a number of tables disclosing the results of the analyses, and it is to be noted that in every instance there was a substantial reduction in the cream of tartar contents, and, in addition, in general, there was a material reduction in the total acids and total ash of the materials tested.

ANALYSES OF WINE AND GRAPE JUICE TREATED WITH THE SOLUBLE CALCIUM COMPOUND DISCLOSED ABOVE

*Table I.—New York State dry red wine*

|  | Untreated | Treated | Refrigerated |
|---|---|---|---|
| Total Acids | .457% | .390% | .412%. |
| Total Ash | .204% | .180% | .164%. |
| Alkalinity of Soluble Ash | 19.0 cc./100 | 10.5 cc./100 | 12.0 cc./100. |
| Alkalinity of Insoluble Ash | 16.0 cc./100 | 15.5 cc./100 | 17.0 cc./100. |
| Cream of Tartar | .36% | .20% | .23%. |
| Calcium Oxide | .0146% | .0142% | .0141%. |
| Phosphorus Pentoxide | .0210% | .0203% | .0205%. |

*Table II.—Dry white wine*

|  | Untreated | Treated | Refrigerated |
|---|---|---|---|
| Total Acids | .498% | .453% | .423%. |
| Total Ash | .292% | .292% | .300%. |
| Alkalinity of Soluble Ash | 20.0 cc./100 | 12.0 cc./100 | 13.5 cc./100. |
| Alkalinity of Insoluble Ash | 21.0 cc./100 | 22.0 cc./100 | 24.0 cc./100. |
| Cream of Tartar | .38% | .23% | .26%. |
| Phosphorus Pentoxide |  |  |  |
| Calcium Oxide | .0137% | .0142% | .0145%. |

*Table III.—Concord grape wine*

|  | Juice Before Fermentation | Wine Treated After Fermentation |
|---|---|---|
| Total Acids | 1.260% | .915%. |
| Total Ash | .618% | .254%. |
| Alkalinity of Soluble Ash | 31.0 cc./100 | 15.5 cc./100. |
| Alkalinity of Insoluble Ash | 20.0 cc./100 | 12.0 cc./100. |
| Cream of Tartar | .58% | .22%. |
| Calcium Oxide | .0120% | .0133%. |
| Phosphorus Pentoxide |  |  |

Table IV.—White grape juice

|  | Untreated | Treated | Refrigerated | Treated (Settled 2 Months) |
|---|---|---|---|---|
| Total Acids | .818% | .660% | .517% | .637%. |
| Total Ash | .540% | .400% | .366% | .418%. |
| Alkalinity of Soluble Ash | 32.0 cc./100 | 21.0 cc./100 | 19.0 cc./100 | 22.0 cc./100. |
| Alkalinity of Insoluble Ash | 16.0 cc./100 | 14.5 cc./100 | 15.0 cc./100 | 24.0 cc./100. |
| Cream of Tartar | .60% | .39% | .36% | .41%. |
| Calcium Oxide | .0141% | .0147% | .0140% | .0149%. |
| Phosphorus Pentoxide | .056% | .0578% | .0548% |  |

The advantage of the instant process is that in the raising of the pH of the products treated, the speed of the reaction is increased and results in efficient precipitation of the total acids. The solubility of the calcium mixture is not increased when added to the grape juice or the wine, such results being usually the case in previously used precipitating agents, causing the calcium to go into solution and falling within the prohibitions of the Federal laws governing the production of these products. There is absolutely no change in the final product other than that which is normally produced in the conventional aging of grape products.

Although there has been described a preferred manner of carrying out the process, it is to be understood that the application is not limited to the precise method disclosed except as may be required by the scope of the following claims.

Having described the invention, what is claimed as new is:

1. A process for removing excess tartrates from grape extracts comprising adding to a predetermined quantity of potassium bitartrate a substance having a pH of 7.8–8.2 in aqueous slurry thereof consisting of a compound selected from the group consisting of calcium oxide and calcium hydroxide admixed with a salt selected from the group consisting of calcium malate and calcium citrate, heating the solution, agitating thoroughly, and reducing the temperature of the solution to precipitate calcium tartrate, said substance being added in an amount equal to the weight of potassium bitartrate to be removed, said substance raising the pH of the clarified extract one unit.

2. The process of claim 1 wherein the solution is heated to 120–130° F. and the temperature is reduced to room temperature.

3. The process of claim 2 and the step of removing the precipitated calcium tartrate.

JOSEPH BERNARD EDMONDS.

REFERENCES CITED

The following references are of record in the file of this patent:

UNITED STATES PATENTS

| Number | Name | Date |
|---|---|---|
| 1,427,903 | Johnston | Sept. 5, 1922 |
| 1,491,390 | Glaeser | Apr. 22, 1924 |
| 1,876,366 | Ungnade | Sept. 2, 1932 |
| 1,915,273 | Eoff | June 27, 1933 |
| 2,002,842 | Torigian | May 28, 1935 |